US008996526B1

(12) United States Patent
Salyers

(10) Patent No.: US 8,996,526 B1
(45) Date of Patent: Mar. 31, 2015

(54) DETERMINING A LASTING VALUE OF CONTENT ITEMS AND PERFORMERS

(71) Applicant: IMDb.com, Inc., Seattle, WA (US)

(72) Inventor: Tanya Salyers, Seattle, WA (US)

(73) Assignee: IMDb.com, Inc., Seattle, WA (US)

( * ) Notice: Subject to any disclaimer, the term of this patent is extended or adjusted under 35 U.S.C. 154(b) by 95 days.

(21) Appl. No.: 13/710,503

(22) Filed: Dec. 11, 2012

(51) Int. Cl.
*G06F 17/30* (2006.01)

(52) U.S. Cl.
CPC .............................. *G06F 17/30598* (2013.01)
USPC ......................................................... 707/737

(58) Field of Classification Search
CPC .......... G06F 17/3071; G06F 17/30864; G06F 17/30598
USPC .................. 707/723, 742, 737, 748
See application file for complete search history.

(56) References Cited

U.S. PATENT DOCUMENTS

| | | | | |
|---|---|---|---|---|
| 6,839,680 | B1 * | 1/2005 | Liu et al. ...................... | 705/7.33 |
| 7,885,887 | B2 * | 2/2011 | Camelio ........................ | 705/37 |
| 7,912,573 | B2 * | 3/2011 | Lee et al. ...................... | 700/182 |
| 8,260,117 | B1 * | 9/2012 | Xu et al. ....................... | 386/262 |
| 2006/0149681 | A1 * | 7/2006 | Meisner ........................ | 705/52 |
| 2007/0143348 | A1 * | 6/2007 | Rosenberg ................. | 707/104.1 |
| 2007/0204301 | A1 * | 8/2007 | Benson ......................... | 725/46 |
| 2010/0215138 | A1 * | 8/2010 | Rowland et al. .............. | 376/254 |
| 2013/0046566 | A1 * | 2/2013 | Camelio ......................... | 705/5 |
| 2014/0040030 | A1 * | 2/2014 | Winters et al. ............. | 705/14.58 |

* cited by examiner

*Primary Examiner* — Rehana Perveen
*Assistant Examiner* — Loc Tran
(74) *Attorney, Agent, or Firm* — Thomas | Horstemeyer, LLP

(57) ABSTRACT

Disclosed are various embodiments for generating a content item metric or a performer metric. The metric can assess a lasting value of a content item or performer by identifying a distribution of a population of users expressing an interest in the content item or performer according to a demographic attribute, such as age.

26 Claims, 7 Drawing Sheets

DETERMINING A LASTING VALUE OF CONTENT ITEMS AND PERFORMERS

BACKGROUND

Content items such as music, movies, television programming, books, etc., as well as performers have varying degrees of popularity. Additionally, content items and performers have varying degrees of lasting value and/or longevity. In other words, certain content items and/or performers may be popular for a very short period of time while others can achieve some degree of lasting value of timelessness where many generations of fans appreciate, purchase and/or consume a particular content item and/or content items associated with a particular performer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to determining and/or predicting a lasting value of a content item and/or performer based upon the demographics attributes of a population of users who express an interest in the content item and/or performer. A system according to embodiments of the disclosure can determine and/or make a prediction regarding whether a particular content item and/or performer may have a lasting value. In the context of this disclosure, a lasting value refers to whether a content item and/or performer may achieve popularity, relevance, and/or any other measure of success for an extended period of time. Therefore, a content item and/or performer having a great deal of lasting value may achieve popularity over longer periods of time relative to those that do not. For example, a classic film may remain popular for years and/or generations, while a summer action film may only be popular for a short period of time.

In the context of the present disclosure, a content item can represent a movie, television show, book, music, or any other media or portion thereof. Additionally, a performer may represent an artist, director, singer, songwriter, actor, producer, or any other person or entity that can be associated with a content item as can be appreciated. Accordingly, as will be described herein, embodiments of the disclosure can calculate a metric associated with one or more content items as well as performers that represent a determination and/or prediction of a lasting value of the content item and/or performer.

Figure 1:
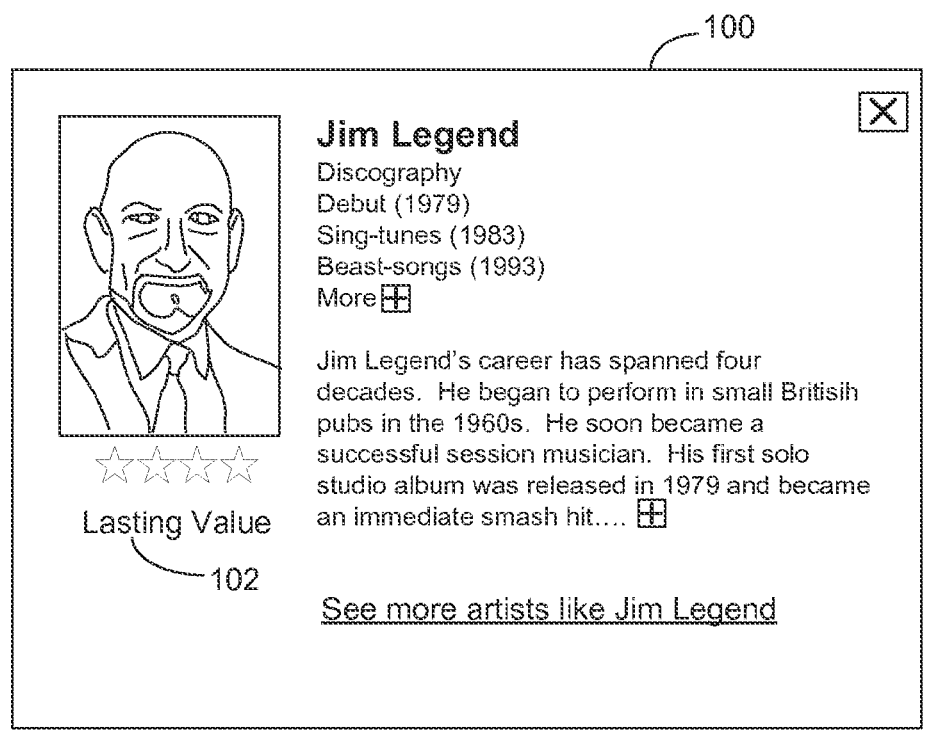
FIG. 1 is a drawing of an example user interface illustrating one use of a metric that can be calculated for a content item and/or performer by various embodiments of the disclosure.

With reference to FIG. 1, shown is an example of a user interface 100 that can be generated in an electronic commerce system, information retrieval system, or any other type of content delivery application. For example, the user interface 100 can be generated by a web application tasked with dynamic generation of web pages that can be transmitted via a network via a web server for rendering by a client device. The depicted example user interface 100 includes information about a performer as well as potential content items. The depicted user interface 100 is one example shown to illustrate one application of a content item metric and/or performer metric that can be generated by various embodiments of the disclosure.

In this non-limiting example, the user interface 100 can include a representation of a metric calculated by embodiments of the disclosure that represents the lasting value 102 of the performer. As will be described herein, the metric represents a longevity of the performer by analyzing the demographic makeup of a population of users who are fans of the performer.

Figure 2:
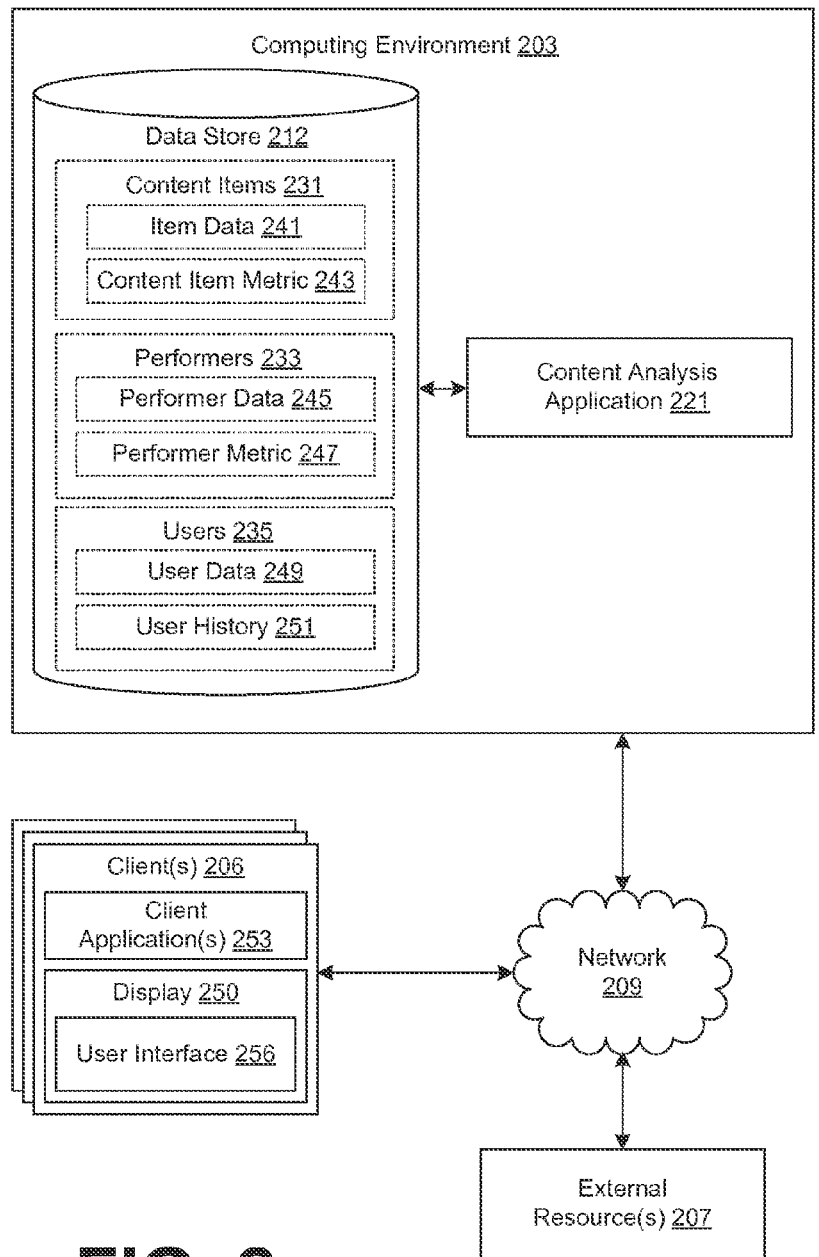
FIG. 2 is a drawing of a networked environment according to various embodiments of the present disclosure.

Next, a discussion of the networked environment 200 is provided in which a content item metric and/or performer metric can be calculated to determine a lasting value of a content item and/or performer. With reference to FIG. 2, shown is a networked environment 200 according to various embodiments. The networked environment 200 includes a computing environment 203, a client device 206, and/or external resources 207, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, one or more server computers or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content analysis application 221, and other applications, services, processes, systems, engines, or functionality not discussed in detail herein. The content analysis application 221 is executed to determine a content item metric and/or performer metric that is based at least upon a distribution of a population of users associated with the content item and/or performer according to a demographic attribute. In one embodiment, the demographic attribute can be an age and/or age range of users who are fans of a particular content item and/or performer. Accordingly, a particular content item may appeal to users who are spread across a wide range of a particular demographic attribute. Therefore, such a content item may have more lasting value if it appeals to a more diverse population of users.

As an alternative example, another content item may appeal to a very large number of users, but these users may be largely concentrated within a particular age range. Accordingly, such a content item may not have a particularly significant lasting value. Therefore, as will be described herein, a content item metric and/or performer metric calculated by embodiments of the disclosure can calculate metrics that express whether an item is likely to have significant lasting value or appeal.

The data stored in the data store 212 includes, for example, information about content items 231, performers 233, and users 235. The data store 212 can include data, for example, that is associated with an electronic commerce system that supports one or more marketplaces in which users can purchase, view, stream, download, rent, or otherwise consume content items and/or information about content items or performers. For example, a content item 231 can be associated with a content file that can include, but is not limited to, an MPEG-1 Audio Layer III (MP3 file) representing an audio track, an MPEG 4 audio file, flash video (fly file), or any audio, video, or image format in which media can be stored and/or transmitted to a client 206. A content item 231 can comprise a single media file and/or collection or album of media files that are associated with a single stock keeping unit or product identifier. Along with content items 231, the data store 212 can house item data 241 about the various content items 231. Item data 241 can comprise product descriptions, performer information, a title, author, album association, genre, or any other data by which a content item 231 can be categorized.

Additionally, each content item 231 can be associated with a content item metric 243 that is calculated by the content analysis application 221 based upon demographics of a population of users associated with the content item 231. In other words, users who are "fans" of a content item 231 or that have otherwise expressed an interest in the content item are considered as being associated with the content item 231.

The data store 212 can also include information about performers 233, which can include artists, authors, musicians, composers, actors, directors, or any other performer that can be associated with one or more content items 231. Performer data 245 can identify one or more content items 231 with which a performer is associated as well as in what capacity. For example, performer data 245 can include an album discography of a musician by identifying the various content items 231 with which the artist is associated. Similarly, performer data 245 can include an actor or director filmography by identifying the various content items 231 with which he or she is associated. Additionally, each performer 233 can be associated with a performer metric 243 that is calculated by the content analysis application 221 based upon demographics of a population of users associated with the performer 233. In other words, users who are "fans" of a performer 233 or that have otherwise expressed an interest in the content item are considered as being associated with the performer 233.

The data store 212 can also include information about users 235, which can include user data 249. User data 249 can store information about users of an electronic commerce system, web site, social networking system, or any other type of system as can be appreciated. User data 249 can include, for example, a user profile, which can include demographic information about a user such as age, location, gender, income, music preferences, movie preferences, likes and dislikes, shipping addresses, telephone numbers, payment information, e-mail addresses, purchasing history, product browsing history, affinity groups with which the user is affiliated, and other data related to users. User data 249 can also include information about one or more third party sites or external resources with which the user is associated, such as a social networking system. In one embodiment, a user of the system can link one or more third party sites with an account of the user, which can allow the content analysis application 221 to access content associated with the user from the third party site such as the user's friends or linked users.

The data store 212 can also store a user history 251 associated with a user account. In one embodiment, a user history 251 can include a browse history of various content items 231, performers 233, and/or content items or performers in which the user has indicated an interest. The user history 251 can also indicate content items 231 that the user 235 has purchased, rented, downloaded, and/or streamed, as well as a frequency with which the user may access a particular content item 231. The user history 251 can be obtained from an electronic commerce system as a user navigates an electronic commerce site or other type of site in which content items 231 or information about content items 231 can be accessed. The user history 251 can also be obtained from an application executed on a client device, such as a media player application on a personal computer, smartphone, tablet device, set-top box, etc.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 250. The display 250 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application 253 and/or other applications. The client application 253 may be executed in a client 206, for example, to access network content served up by the computing environment 203 and/or other servers, thereby rendering a user interface 256 on the display 250. To this end, the client application 253 may comprise, for example, a browser, a dedicated application, etc., and the user interface 256 may correspond to a network page, an application screen, etc. The client 206 may be configured to execute applications beyond the client application 253 such as, for example, email applications, social networking applications, word processors, spreadsheets, and/or other applications.

The external resources 207 may comprise a plurality of external computing devices 203, services, network sites, and/or application programming interfaces (API's) used by the content analysis application 221. For example, the content analysis application 221 may communicate with a plurality of social networking sites in order to determine demographics, preferences, and/or any information associated with one or more users through an API. For example, the content analysis application 221 may identify a given user's friends in a social networking system via such an API to analyze the content and/or performer preferences of the user as well as the user's friends. As another example, the content analysis application 221 may also identify a user's preferences, likes, and/or dislikes as expressed in a social networking system to determine whether the user should be accounted for when calculating a content item metric 243 and/or performer metric 247 for a given content item 231 or performer 233, respectively.

Next, a general description of the operation of the various components of the networked environment 200 is provided. To begin, embodiments of the disclosure can calculate a content item metric 243 associated with a content item 231 that provides an indication of the appeal of a content item 231. Additionally, embodiments of the disclosure can also calculate a performer metric 247 that provides an indication of the appeal of a performer 233. Accordingly, both types of metrics are referred to generally herein as a metric or a lasting value. As noted above, the metric can provide an indication about the longevity of the appeal of a particular performer 233 and/or content item 231. The metric can also provide an indication regarding whether a content item 231 and/or performer 233 is likely to have a lasting value based upon demographic attributes of users expressing an interest in a particular content item 231 and/or performer 233.

In one embodiment, the content analysis application 221 can generate a metric based upon the distribution of a population of users associated with a content item and/or performer according to a demographic attribute. For example, the metric can be based upon the age distribution of a population of users who have a demonstrated interest in a particular content item and/or performer. A demonstrated interest can be deduced by the content analysis application 221 by determining whether a particular content item 231 and/or content associated with a particular performer 233 is present within a purchase history of a user 235, a download history, a steaming history, a rental history, a search history or any other form of consumption history. A demonstrated interest can also be expressly indicated by a user 235. For example, a user can expressly indicate that he or she is a fan of a particular content item 231 and/or performer 233 in a social networking system, an electronic commerce system, in a user interface in a client application 253, etc.

Therefore, the content analysis application 221 can identify a population of users across a base of users that exhibit such an interest in a particular content item 231 and/or performer 233 and generate an age distribution of the users. The metric can then be based at least in part upon the shape of the age distribution, or the extent to which the age of the users is distributed. For example, if the age of the population of users is relatively concentrated in a handful of age brackets, then the metric can reflect relatively little lasting value compared to a situation in which the age of the population of users is evenly spread across many age brackets.

In other words, the content analysis application 221 can generate a histogram so that the population of users having the demonstrated interest are placed into various bins corresponding to their age and/or age range. Accordingly, the flatter the shape of the histogram, meaning the more evenly distributed the users are across the various bins, the more lasting value that the content item 231 and/or performer 233 possesses, as the content item 231 and/or performer 233 appeals to a more diverse age group of users 235. If the histogram has one or a few peaks, the metric can reflect less of a lasting value, as interest is concentrated into one or a few age brackets. In some embodiments, the distribution of users can be normalized in various ways. In one example, the content analysis application 221 can normalize a particular bin based on the total number of users associated with the demographic attribute associated with the bin. In other words, the bins of a histogram can be generated by the content analysis application 221 according to a percentage of total users of a particular range associated with each of the bins who are associated with a particular content item and/or performer.

Stated another way, the content analysis application 221 can calculate a metric associated with a lasting value of a content item 231 and/or performer 233 by counting the number of bins in which a threshold number of users appear for a given content item and/or performer. For example, the content analysis application 221 can identify bins in which a minimum number of users appear with respect to a given content item and/or performer. Accordingly, the greater the number of bins in which a threshold number of users appears relative to other content items or performers, the more lasting value the content item and/or performer possesses. In some embodiments, a metric can be associated with a greater lasting value based upon the contiguousness of the bins in which users appear. In other words, the more contiguous the shape of the histogram relative to histograms of other items or performers, the more lasting value that can be associated with the content item and/or performer.

Additionally, the shape of such a histogram can be mathematically characterized to facilitate the generation of content item and/or performer recommendations. For example, a curve fit can be performed to identify a mathematical function that can characterize a curve that approximates the histogram. Accordingly, the content analysis application 221 can identify other content items 231 and/or performers 233 that have a similarly shaped histogram relative to a particular item under analysis in order to generate recommendations of items that may have a similar lasting value.

In some embodiments, the content analysis application 221 can also limit the population of users upon which a metric is calculated. For example, the content analysis application 221 can calculate a metric by limiting candidates for the population of users demonstrating an interest in a particular content item or performer to those who are linked to a particular user within a social networking system. In this way, the content analysis application 221 can provide a metric that represents a determination of whether a particular content item 231 and/or performer 233 has a lasting value among other users with whom a particular user may share interests. In other embodiments, the content analysis application 221 can also calculate a metric by determining a distribution user having an interest in a content item 231 and/or performer 233 according to a different demographic attribute, such as location, income, gender, or other demographic attributes. In this way, a metric generated by the content analysis application 221 can express whether a particular content item 231 and/or performer 233 appeals to a diverse set of users with respect to the demographic attribute(s) that are encompassed in the metric.

Figure 3:
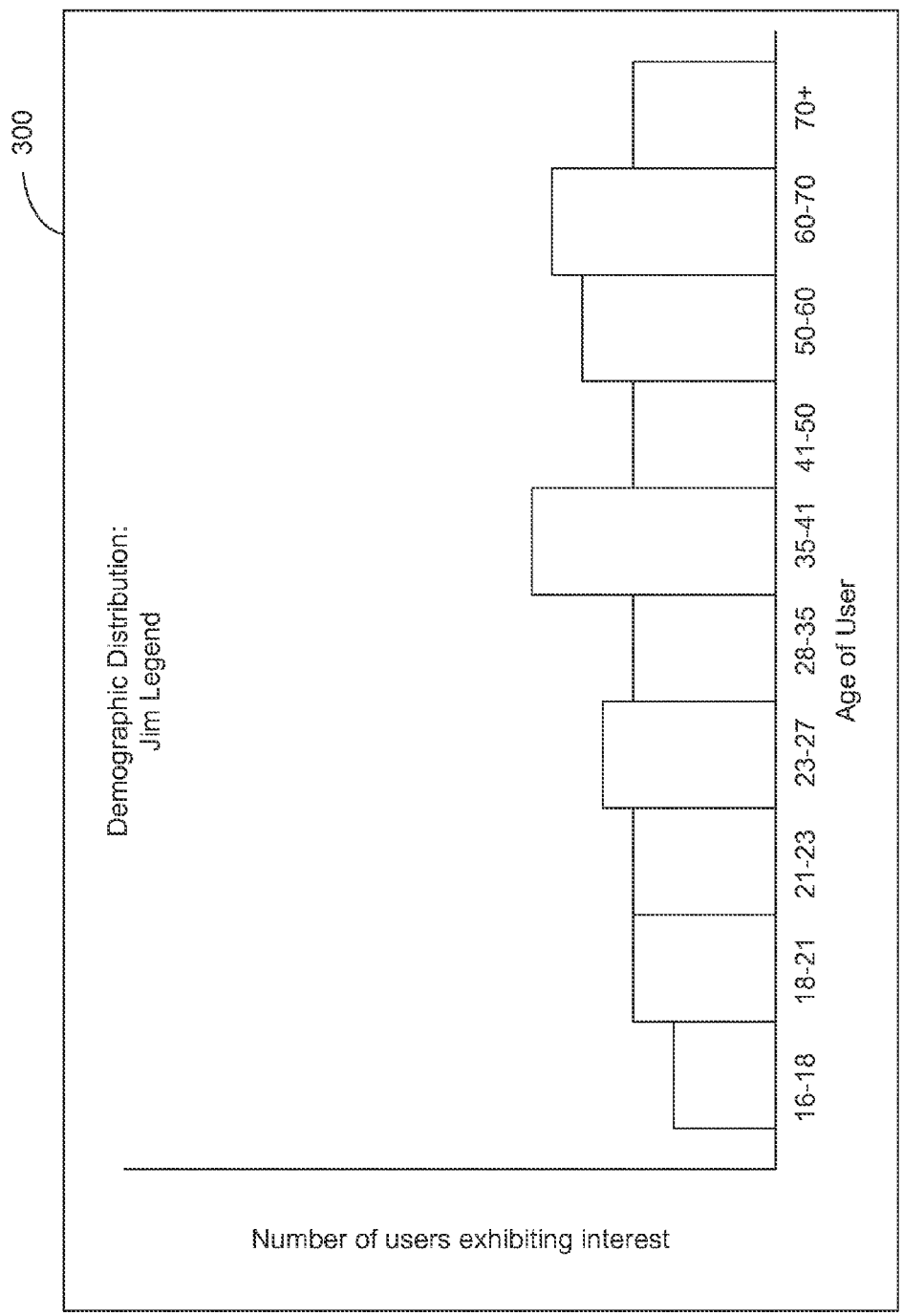
FIGS. 3-5 are drawings illustrating histograms representing data from which a content item metric and/or performer metric can be calculated according to various embodiments of the disclosure.

Referring next to FIG. 3, shown is an example of a histogram 300 that can be generated by the content analysis application 221 and that represents a distribution of a population of users according to a demographic attribute (e.g., age) having an interest in a particular performer 233. It should be appreciated that the histogram can also represent a distribution of a population of users with respect to a particular content item 231 as well. FIG. 3 illustrates an example of a histogram associated with a performer 233 from which a performer metric can be calculated that is associated with a high degree of lasting value because the fans of the performer 233 span a large number of age brackets.

As noted above, the distribution of users can also be normalized in various ways. For example, the bins of the histogram, representing a particular age range can represent a percentage of all users of that particular age range who have a demonstrated interest in the performer 233 shown in the example of FIG. 3.

Figure 4:
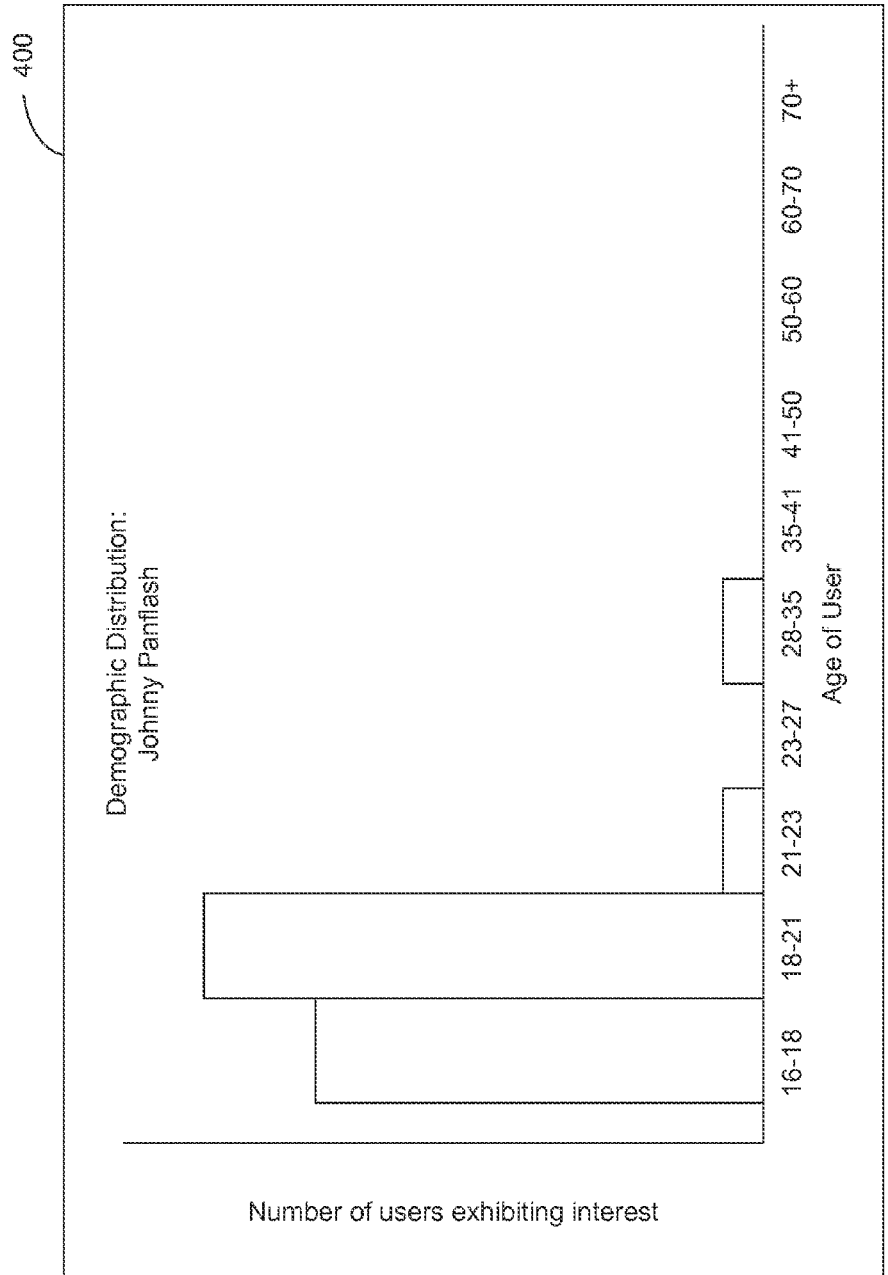

As also noted above, a metric associated with a high degree of lasting value can be associated with a large number of bins in which users are placed relative to other histograms of other performers 233. It should be appreciated that in some embodiments, various permutations and combination of age brackets that define the various bins of the histogram 300 can be selected and that the depicted example is only one example. In contrast to the example of FIG. 3, reference is now made to FIG. 4, which illustrates an alternative example of a histogram 400 that illustrates a data set from which a performer metric can be calculated. As shown in the example of FIG. 4, the distribution of the population of users having a demonstrated interest in the performer 233 differs from the example of FIG. 3.

In the depicted example, the number of bins of the histogram in which a threshold number of users appears is less than the example of FIG. 3. Accordingly, a performer metric that is based upon the number of bins of the histogram in which users appear would reflect that the performer shown in FIG. 4 has less of a lasting value than in the case of FIG. 3. Additionally, a performer metric that is based upon the contiguousness of the histogram would also reflect that the performer shown in FIG. 4 has less of a lasting value than in the case of FIG. 3.

Figure 5:
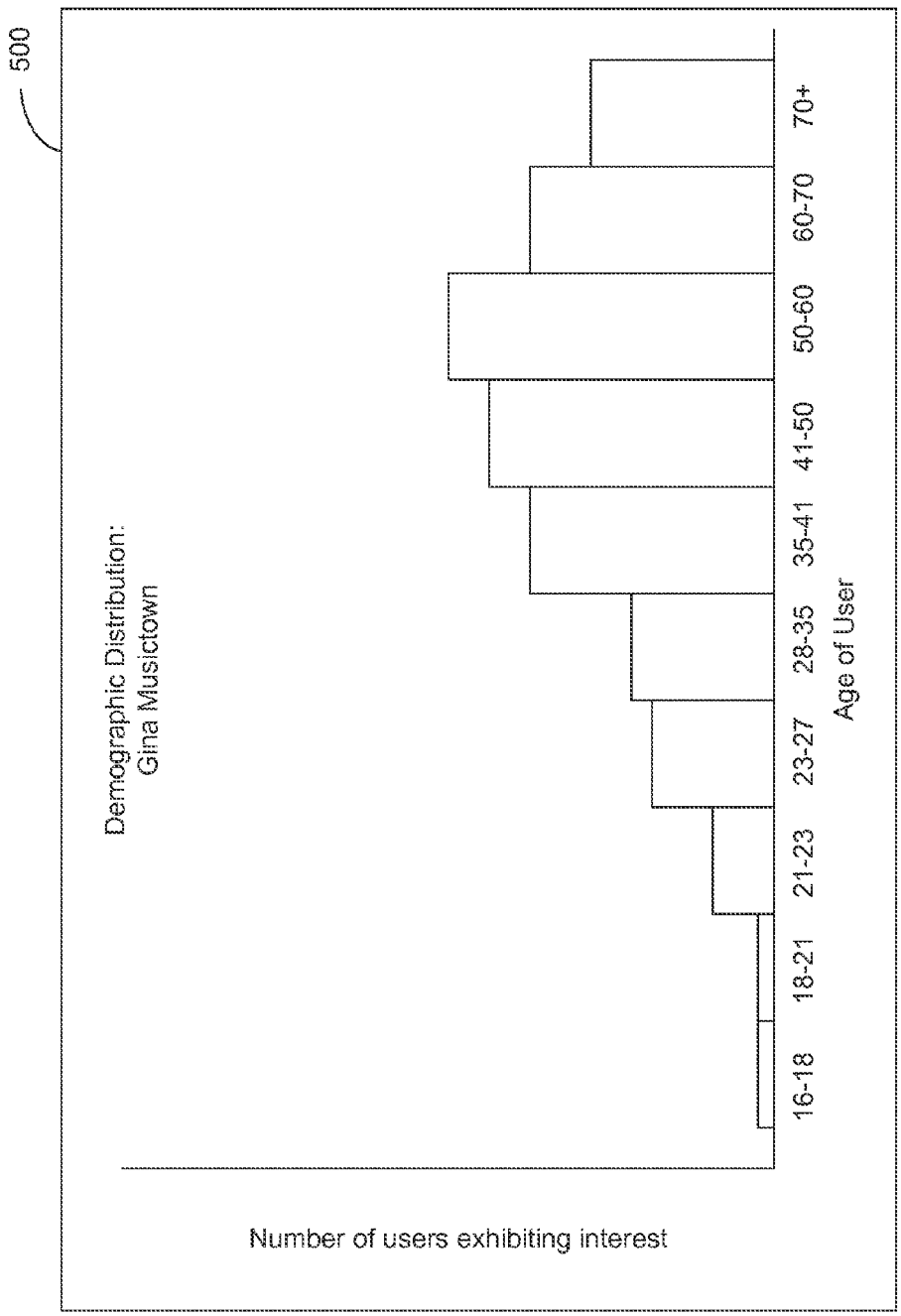

In contrast to the example of FIG. 3, reference is now made to FIG. 5, which illustrates an alternative example of a histogram 500 that illustrates a data set from which a performer metric can be calculated. As shown in the example of FIG. 5, the distribution of the population of users having a demonstrated interest in the performer 233 differs from the example of FIG. 3. In contrast to the example of FIG. 4, the histogram 500 shown in FIG. 5 illustrates an example where the number of bins as well as the contiguousness of the bins of the histogram are the same as in the case of FIG. 3. Accordingly, a performer metric can also take into account the shape of the histogram. Therefore, as shown in the example of FIG. 5, the histogram 500 possesses greater variation in bin sizes relative to the example of FIG. 3. Therefore, a greater variation in relative bin size within a histogram can be associated with a metric that reflects less of a lasting value relative to less variation.

Figure 6:
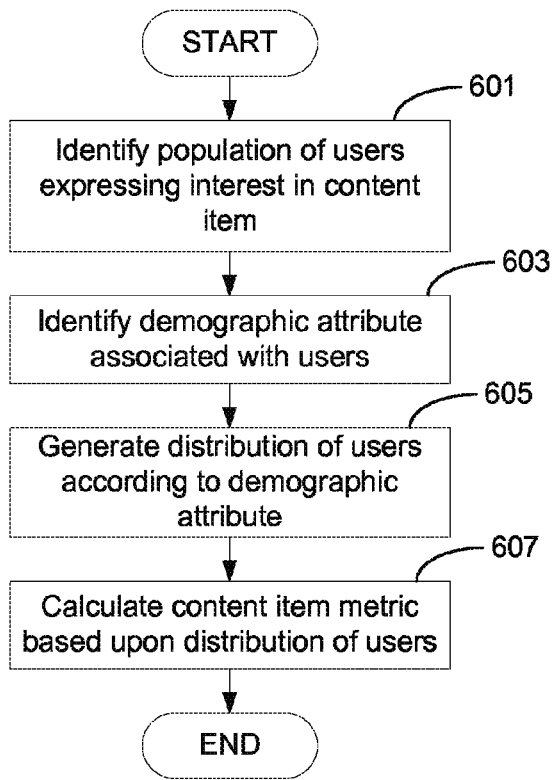
FIGS. 6-7 are flowcharts illustrating examples of functionality implemented as portions of the content analysis application executed in a computing environment of FIG. 2 according to various embodiments of the present disclosure.

Referring next to FIG. 6, shown is a flowchart that provides one example of the operation of a portion of the content analysis application 221 according to various embodiments. It is understood that the flowchart of FIG. 6 provides merely an example of the many different types of functional arrangements that may be employed to implement the operation of the portion of the content analysis application 221 as described herein. As an alternative, the flowchart of FIG. 6 may be viewed as depicting an example of steps of a method implemented in the computing environment 203 (FIG. 2) according to one or more embodiments.

First, in box 601, the content analysis application 221 identifies a population of users expressing an interest in a content item 231. In box 603, the content analysis application 221 identifies a demographic attribute for each of the users upon which a content item metric is based. For example, in the case of a lasting value metric based at least in part upon the age of users, the content analysis application 221 can identify the age of the users. In box 605, the content analysis application 221 then generates a distribution of users according to the demographic attribute. For example, as noted above, the content analysis application 221 can generate an age distribution of the population of users. Finally, in box 607, the content analysis application 221 can generate a content item metric based upon the distribution. For example, as noted above, the content analysis application 221 can generate a metric that expresses a lasting value of a content item 231 by examining the distribution of users according to age.

Figure 7:
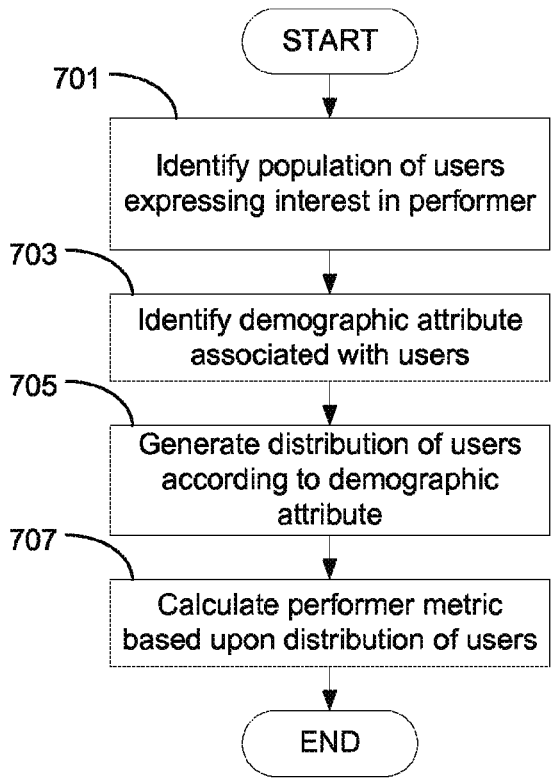

Referring next to FIG. 7, shown is a flowchart that provides one example of the operation of a portion of the content analysis application 221 according to various embodiments. It is understood that the flowchart of FIG. 7 provides merely an example of the many different types of functional arrangements that may be employed to implement the operation of the portion of the content analysis application 221 as described herein. As an alternative, the flowchart of FIG. 7 may be viewed as depicting an example of steps of a method implemented in the computing environment 203 (FIG. 2) according to one or more embodiments.

First, in box 701, the content analysis application 221 identifies a population of users expressing an interest in a performer 233. In box 703, the content analysis application 221 identifies a demographic attribute for each of the users upon which a performer metric is based. For example, in the case of a lasting value metric based at least in part upon the age of users, the content analysis application 221 can identify the age of the users. In box 705, the content analysis application 221 then generates a distribution of users according to the demographic attribute. For example, as noted above, the content analysis application 221 can generate an age distribution of the population of users. Finally, in box 707, the content analysis application 221 can generate a content item metric based upon the distribution. For example, as noted above, the content analysis application 221 can generate a metric that expresses a lasting value of a performer 233 by examining the distribution of users according to age.

Figure 8:
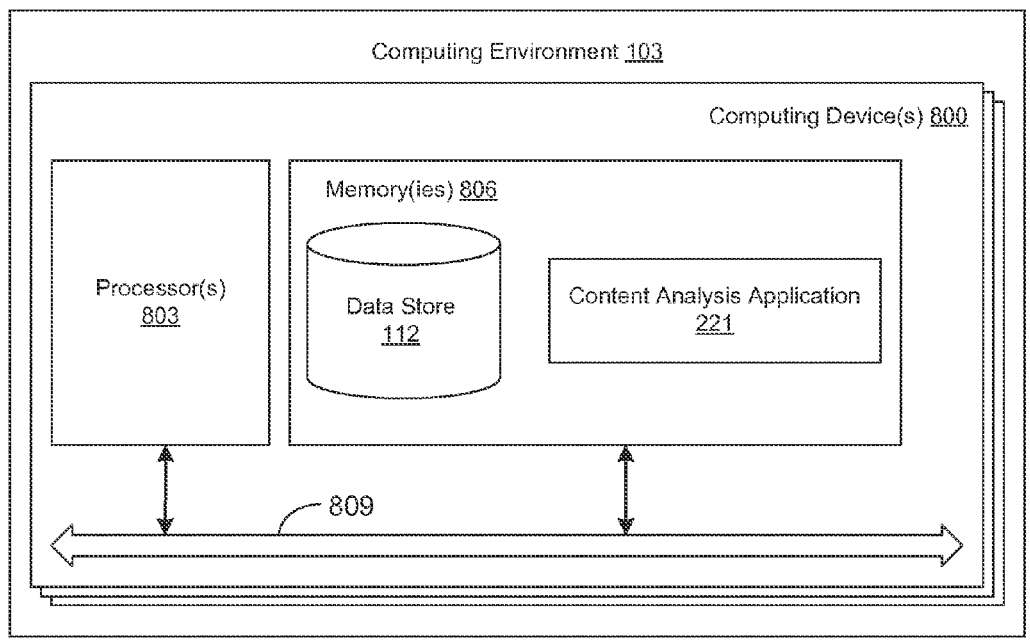
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803, content analysis application 221 and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the content analysis application 221 and other various systems described herein may be embodied in software or code executed by general purpose hardware as discussed above, as an alternative, the same may also be embodied in dedicated hardware or a combination of software/ general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 6-7 show the functionality and operation of an implementation of portions of the content analysis application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIG. 6-7 show a specific order of execution, it is understood that the order of execution may differ from that which is depicted. For example, the order of execution of two or more blocks may be scrambled relative to the order shown. Also, two or more blocks shown in succession in FIG. 6-7 may be executed concurrently or with partial concurrence. Further, in some embodiments, one or more of the blocks shown in FIG. 6-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content analysis application 221, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles Therefore, the following is claimed:

1. A non-transitory computer-readable medium embodying a program executable in at least one computing device, comprising:

code that identifies a population of users having a demonstrated interest in at least one of a content item or a performer, the content item comprising one of a music content item or a video content item;

code that identifies an age of each of the users from the population of users;

code that generates a plurality of ordered bins into which the population of users can be separated according to the identified age of each of the users from the population of users, the plurality of ordered bins being ordered consecutively according to a respective age or age range associated with each of the plurality of ordered bins;

code that identifies a respective one of the plurality of ordered bins into which each user from the population of users can be placed according to the identified age of each of the users;

code that places each user from the population of users into the respective one of the plurality of ordered bins; and code that calculates at least one of a content item metric or a performer metric associated with a measure of lasting value of the at least one of the content item or the performer based at least in part upon a distribution of the population of users across the plurality of ordered bins, the distribution based at least in part upon the number of the plurality of ordered bins into which the population of users is distributed or a contiguousness of the plurality of ordered bins into which the population of users is distributed.

2. A system, comprising:

at least one computing device; and a content analysis application executable in the at least one computing device, the content analysis application comprising:

logic that identifies a population of users having a demonstrated interest in a content item;

logic that identifies a demographic attribute associated with each of the users in the population of users based at least in part upon an age of each of the users;

logic that determines a distribution of the population of users comprising:

logic that generates a plurality of ordered bins into which the demographic attribute can be separated, the plurality of ordered bins being ordered consecutively according to a respective demographic attribute or demographic attribute range associated with each of the plurality of ordered bins;

logic that identifies a respective one of the plurality of ordered bins into which each user from the population of users can be placed according to the demographic attribute; and logic that places each user from the population of users into the respective one of the plurality of bins according to the demographic attribute; and logic that calculates a content item metric providing an indication of appeal based at least in part upon the distribution of the population of users across the plurality of ordered bins, the distribution based at least in part upon the number of the plurality of ordered bins into which the population of users is distributed or a contiguousness of the plurality of ordered bins into which the population of users is distributed.

3. The system of claim 2, wherein the demographic attribute associated with each of the users in the population of users further comprises a gender, a geographic location, or a group membership.

4. The system of claim 2, wherein the content analysis application further comprises logic that generates a histogram based at least in part upon the plurality of ordered bins.

5. The system of claim 4, wherein the content analysis application further comprises logic that mathematically characterizes a shape of the histogram.

6. The system of claim 2, wherein the content analysis application further comprises logic that generates a content recommendation by identifying at least one other content item having a respective content item metric that is similar to the content item metric.

7. The system of claim 2, wherein the logic that identifies the population of users having the demonstrated interest in the content item further comprises logic that identifies a plurality of users in a social network of a first user.

8. The system of claim 2, wherein the logic that calculates the content item metric providing the indication of appeal based at least in part upon the distribution of the population of users across the plurality of ordered bins further comprises logic that weighs the plurality of ordered bins based at least in part upon a number of users within each of the plurality of ordered bins.

9. The system of claim 2, wherein the logic that calculates the content item metric providing the indication of appeal based at least in part upon the distribution of the population of users across the plurality of ordered bins further comprises logic that calculates the content item metric based at least in part upon a distribution of a number of users within each of the plurality of ordered bins into which the population of users is distributed.

10. The system of claim 2, wherein the logic that identifies the demographic attribute associated with each of the users in the population of users further comprises logic that identifies the demographic attribute in a user account in an electronic commerce system associated with each of the users in the population of users.

11. The system of claim 2, wherein the logic that identifies the population of users having the demonstrated interest in the content item further comprises:

logic that determines whether a user demonstrates an interest in an attribute associated with the content item; and logic that adds the user to the population of users.

12. The system of claim 11, wherein the attribute associated with the content item comprises a performer associated with the content item.

13. The system of claim 11, wherein the logic that determines whether the user demonstrates an interest in an attribute associated with the content item further comprises logic that determines whether the content item appears in an account history associated with a user account of the user.

14. The system of claim 13, wherein the account history includes at least one of a rental history, a purchase history, or a consumption history.

15. A method, comprising:

identifying, in at least one computing device, a population of users having a demonstrated interest in a performer;

identifying, in the at least one computing device, a demographic attribute associated with each of the users in the population of users comprising an age of each of the users;

determining, in the at least one computing device, a distribution of the population of users comprising:
   generating a plurality of ordered bins into which the demographic attribute can be separated, the plurality of ordered bins being ordered consecutively according to a respective demographic attribute or demographic attribute range associated with each of the plurality of ordered bins;
   identifying a respective one of the plurality of ordered bins into which each user from the population of users can be placed according to the demographic attribute; and
   placing each user from the population of users into the respective one of the plurality of ordered bins; and
calculating, in the at least one computing device, a performer metric providing an indication of appeal based at least in part upon the distribution of the population of users across the plurality of ordered bins, the distribution based at least in part upon the number of the plurality of ordered bins into which the population of users is distributed or a contiguousness of the plurality of ordered bins into which the population of users is distributed.

16. The method of claim 15, further comprising generating a histogram based at least in part upon the plurality of ordered bins.

17. The method of claim 15, wherein calculating the performer metric providing the indication of appeal based at least in part upon the distribution of the population of users across the plurality of ordered bins further comprises calculating the performer metric based at least in part upon a distribution of a number of users within each of the plurality of ordered bins into which the population of users is distributed.

18. The method of claim 16, further comprising characterizing a shape of the histogram mathematically.

19. The method of claim 15, wherein the demographic attribute associated with each of the users in the population of users further comprises a gender, a geographic location, or a group membership.

20. The method of claim 15, further comprising generating a performer recommendation by identifying at least one other performer having a respective performer metric that is similar to the performer metric.

21. The method of claim 15, wherein identifying the demographic attribute associated with each of the users in the population of users further comprises identifying a plurality of users in a social network of a first user.

22. The method of claim 15, wherein calculating the performer metric providing the indication of appeal based at least in part upon the distribution of the population of users across the plurality of ordered bins further comprises calculating the performer metric based at least in part upon a number of users within each of the plurality of bins.

23. The method of claim 15, wherein identifying the demographic attribute associated with each of the users in the population of users further comprises identifying the demographic attribute in a user account in an electronic commerce system associated with each of the users in the population of users.

24. The method of claim 15, wherein identifying the population of users having the demonstrated interest in the performer further comprises:
   determining whether a user demonstrates an interest in an attribute associated with the performer; and
   logic that adds the user to the population of users.

25. The method of claim 24, wherein determining whether the user demonstrates an interest in an attribute associated with the performer further comprises determining whether the performer appears in an account history associated with a user account of the user.

26. The method of claim 25, wherein the account history includes at least one of a rental history, a purchase history, or a consumption history.

* * * * *